US007835469B2

(12) United States Patent
Pessa

(10) Patent No.: US 7,835,469 B2
(45) Date of Patent: Nov. 16, 2010

(54) METHOD OF COMPENSATING SKEW, DIGITAL COMMUNICATION SYSTEM, RECEIVER, ELECTRONIC DEVICE, CIRCUIT AND COMPUTER PROGRAM PRODUCT

(75) Inventor: Marko Pessa, Oulu (FI)

(73) Assignee: Nokia Corporation, Espoo (FI)

( * ) Notice: Subject to any disclaimer, the term of this patent is extended or adjusted under 35 U.S.C. 154(b) by 1117 days.

(21) Appl. No.: 11/118,664

(22) Filed: Apr. 29, 2005

(65) Prior Publication Data

US 2006/0245523 A1     Nov. 2, 2006

(51) Int. Cl.
*H03D 3/18* (2006.01)
(52) U.S. Cl. .................. 375/328; 375/316; 375/327; 375/355; 375/371; 375/375; 327/156; 327/158
(58) Field of Classification Search .......... 375/226, 375/243, 293, 326, 328, 346, 350, 355, 359–360, 375/365–366, 371, 375–376, 135, 145, 374, 375/219; 714/700
See application file for complete search history.

(56) References Cited

U.S. PATENT DOCUMENTS

| | | | |
|---|---|---|---|
| 5,852,630 A * | 12/1998 | Langberg et al. ............ 375/219 |
| 7,020,862 B1 * | 3/2006 | Alfke et al. .................... 716/6 |
| 7,315,599 B1 * | 1/2008 | Morriss ...................... 375/371 |
| 7,535,271 B2 * | 5/2009 | Kizer ......................... 327/156 |
| 2004/0085109 A1 * | 5/2004 | Hariharan et al. ........... 327/165 |
| 2005/0111602 A1 * | 5/2005 | Suda et al. .................. 375/355 |
| 2006/0006918 A1 * | 1/2006 | Saint-Laurent ............. 327/295 |
| 2006/0036915 A1 * | 2/2006 | Takei et al. ................. 714/700 |
| 2006/0153039 A1 * | 7/2006 | Looijkens ................ 369/59.12 |
| 2006/0188050 A1 * | 8/2006 | Jenkins et al. .............. 375/371 |
| 2008/0013668 A1 * | 1/2008 | Willis ......................... 377/56 |

* cited by examiner

*Primary Examiner*—Shuwang Liu
*Assistant Examiner*—Hirdepal Singh
(74) *Attorney, Agent, or Firm*—Hollingsworth & Funk, LLC

(57) ABSTRACT

There is provided a receiver comprising: a control unit for controlling the functions of the receiver; a receiving unit for receiving data signals and timing signals; and a digitally controlled delay line unit connected to the receiving unit and to the control unit. The control unit is configured to measure several samples of the received data signal and the timing signal, to determine average values of the several measured samples of the data signal and the timing signal for defining compensation values, and the digitally controlled delay line unit is configured to adjust the number of unit delay elements for compensating for skew between the data signal and the timing signal on the basis of the defined compensation values.

21 Claims, 7 Drawing Sheets

US 7,835,469 B2

METHOD OF COMPENSATING SKEW, DIGITAL COMMUNICATION SYSTEM, RECEIVER, ELECTRONIC DEVICE, CIRCUIT AND COMPUTER PROGRAM PRODUCT

FIELD

The invention relates to a method of compensating skew in a digital communication system, to a digital communication system, to a receiver, to an electronic device, to a circuit and to a computer program product.

BACKGROUND

Due to several reasons there is only a small time margin for a digital logic to work at a receiver of a communications system. The timing margin gets worse when data rate rises higher. The timing margin may be reduced by several imperfections, such as transmitter jitter and skew, clock duty cycle in transmitter clock, printed board trace length differences (causes static skew), receiver asymmetries (bias current mismatches, offset-voltages etc.), and delays in internal clock path.

In systems where two signals are used to transmit data, the skew between the two signals can cause instability in the output signals. The signals used may be data and strobe or data and clock depending on the operation mode. When there is skew between two signals the internal clock of the receiver may get asymmetric, that is, the duty cycle deviates from 50%. FIG. 1 illustrates an ideal case where skew between data and strobe signals is zero. In this case the skew is calculated as deviations from the ideal locations of the signal edges. CLK_XOR 14 is a slightly delayed XOR function of DATA 10 and STROBE 12, and it shows 50% duty cycle. FIG. 2 illustrates a non-ideal case where STROBE 12 rising edge has moved from an ideal position 13 closer to the DATA rising edge. Thus, the skew is not zero. Now the pulse shape of the CLK_XOR 14 is not symmetric any more, i.e. the duty cycle is different from 50%. If the pulse shape gets too much distorted, the setup or hold-times of internal flip-flops may get violated and the data is captured incorrectly.

BRIEF DESCRIPTION OF THE INVENTION

An object of the invention is to provide an improved method of compensating skew, an improved digital communication system, a receiver, an electronic device and a circuit, and an improved computer program product.

According to an aspect of the invention, there is provided a method of compensating skew in a digital communication system using a data signal and a timing signal for communicating data, the method comprising: receiving the data signal and the timing signal by a receiver; measuring several samples of the received data signal and the timing signal; determining average values of the several measured samples of the data signal and the timing signal for defining compensation values; and adjusting the number of unit delay elements for compensating for skew between the data signal and the timing signal on the basis of the defined compensation values.

According to another aspect of the invention, there is provided a digital communication system, comprising a transmitter for transmitting data signals and timing signals for communicating data, and a receiver for receiving the transmitted data signals and timing signals. The receiver comprises a control unit for controlling the functions of the receiver, wherein the control unit is further configured to measure several samples of the received data signal and the timing signal, to determine average values of the several measured samples of the data signal and the timing signal for defining compensation values, and to adjust the number of unit delay elements for compensating for skew between the data signal and the timing signal on the basis of the defined compensation values.

According to another aspect of the invention, there is provided a receiver, comprising: a control unit for controlling the functions of the receiver; a receiving unit for receiving data signals and timing signals; a digitally controlled delay line unit connected to the receiving unit and to the control unit. The control unit is configured to measure several samples of the received data signal and the timing signal, to determine average values of the several measured samples of the data signal and the timing signal for defining compensation values, and the digitally controlled delay line unit is configured to adjust the number of unit delay elements for compensating for skew between the data signal and the timing signal on the basis of the defined compensation values.

According to another aspect of the invention, there is provided an electronic device, comprising a receiver including: a control unit for controlling the functions of the receiver; a receiving unit for receiving data signals and timing signals; a digitally controlled delay line unit connected to the receiving unit and to the control unit, the control unit being configured to measure several samples of the received data signal and the timing signal, to determine average values of the several measured samples of the data signal and the timing signal for defining compensation values, and the digitally controlled delay line unit being configured to adjust the number of unit delay elements for compensating for skew between the data signal and the timing signal on the basis of the defined compensation values.

According to another aspect of the invention, there is provided a circuit for use in a receiver, comprising: a control block for controlling the functions of the circuit; a digitally controlled delay line block connected to the control block; a measuring block for measuring several samples of received data and the timing signals; a filtering block connected to the measuring block and to the control block for determining average values of the several measured samples of the data signal and the timing signal for defining compensation values, the digitally controlled delay line block being configured to adjust the number of unit delay elements for compensating for skew between the data signal and the timing signal on the basis of the defined compensation values received from the control block.

According to another aspect of the invention, there is provided a computer program product encoding a computer program of instructions for executing a computer process for compensating for skew in a digital communication system using a data signal and a timing signal for communicating data, the process comprising: receiving the data signal and the timing signal by a receiver; measuring several samples of the received data signal and the timing signal; determining average values of the several measured samples of the data signal and the timing signal for defining compensation values; and adjusting the number of unit delay elements for compensating for skew between the data signal and the timing signal on the basis of the defined compensation values.

According to another aspect of the invention, there is provided a receiver, comprising: controlling means for controlling the functions of the receiver; receiving means for receiving data signals and timing signals; measuring means for measuring several samples of the received data signal and the timing signal; determining means for determining average values of the several measured samples of the data signal and the timing signal for defining compensation values; and adjusting means for adjusting the number of unit delay elements for compensating for skew between the data signal and the timing signal on the basis of the defined compensation values.

The invention provides several advantages. A fully digital real-time compensation for skew is provided. Support from protocols is not needed; the embodiments can be used for data links that do not support skew calibration or compensation. Extra signalling between transmitters and receivers is not needed for skew compensation purposes.

LIST OF DRAWINGS

In the following, the invention will be described in greater detail with reference to the embodiments and the accompanying drawings, in which FIG. 1 illustrates an ideal case related to a CSI (Camera Serial Interface) interface where skew between two signals is zero;

DESCRIPTION OF EMBODIMENTS

Figure 1:
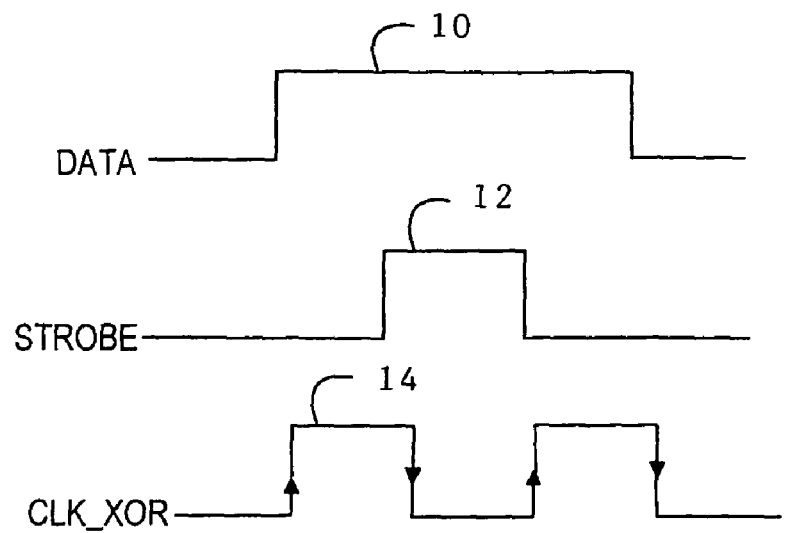
Figure 2:
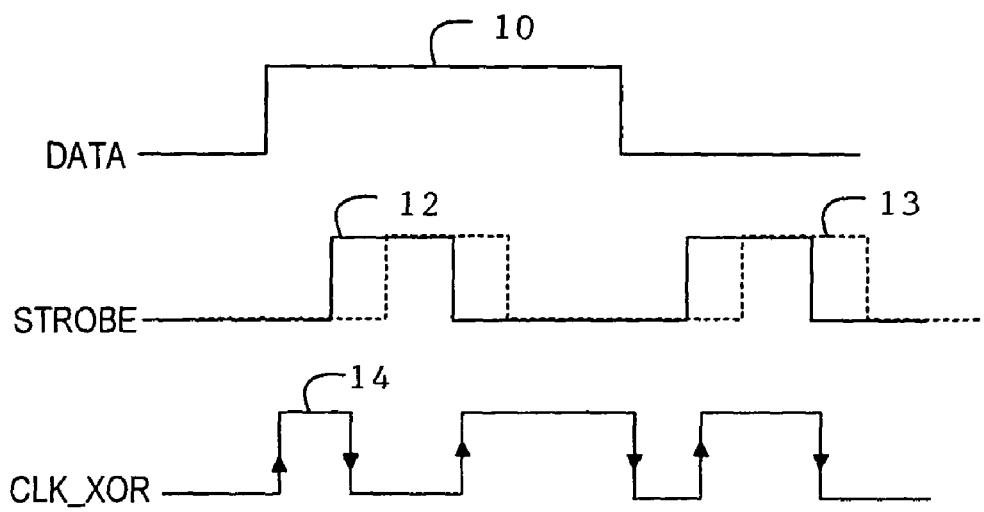
FIG. 2 illustrates an unideal case related to CSI interface where skew between two signals is not zero.
Figure 3:
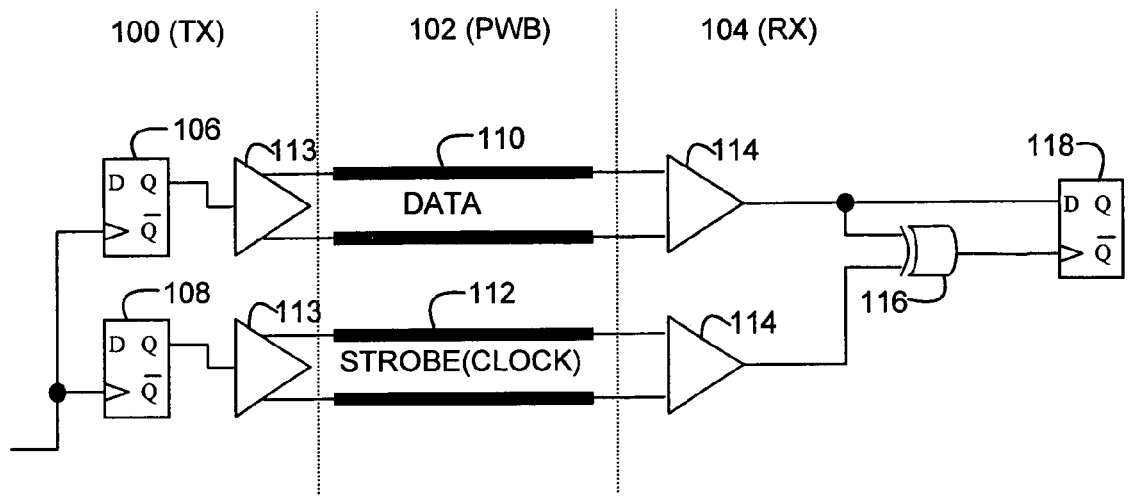
FIG. 3 shows a simplified schematic of a CSI-specific communications system.

With reference to FIG. 3, let us examine an example of a simplified schematic of a digital communications system to which embodiments of the invention can be applied. The embodiments described later are suitable for digital buses using two signals for transmitting data. An example of a digital communications system is, for example, a CSI (Camera Serial Interface) interface used in interfacing cameras and digital ASIC (Application Specific Integrated Circuit).

FIG. 3 is divided into three parts 100, 102, 104, the parts being a transmitter 100, a printed circuit board 102 and a receiver 104. The signals used are a data signal 110 and a clock signal 112 or a strobe signal 112. Depending on the operation mode, data and strobe (class1-operation mode) signals or data and clock (class0-operation mode) signals are used. In the class1-mode only one signal can change the state at a time while in the class0-mode the clock keeps running all the time during data transmission. In the following description, a timing signal 112 stands for both a clock signal and a strobe signal.

The data signals 110 and the timing signals 112 are transmitted from the transmitter 100 through flip-flops 106, 108 and drivers 113 and via the printed circuit board 102 to the receiver 104. The receiver 104 comprises comparators 114, logic circuits, such as XOR (exclusive OR) gates 116, and flip-flops 118 that are used for receiving data signals 110 and timing signals 112. The receiver 104 generates an internal clock with the XOR gate 116, and may use this clock to latch the data.

Figure 4:
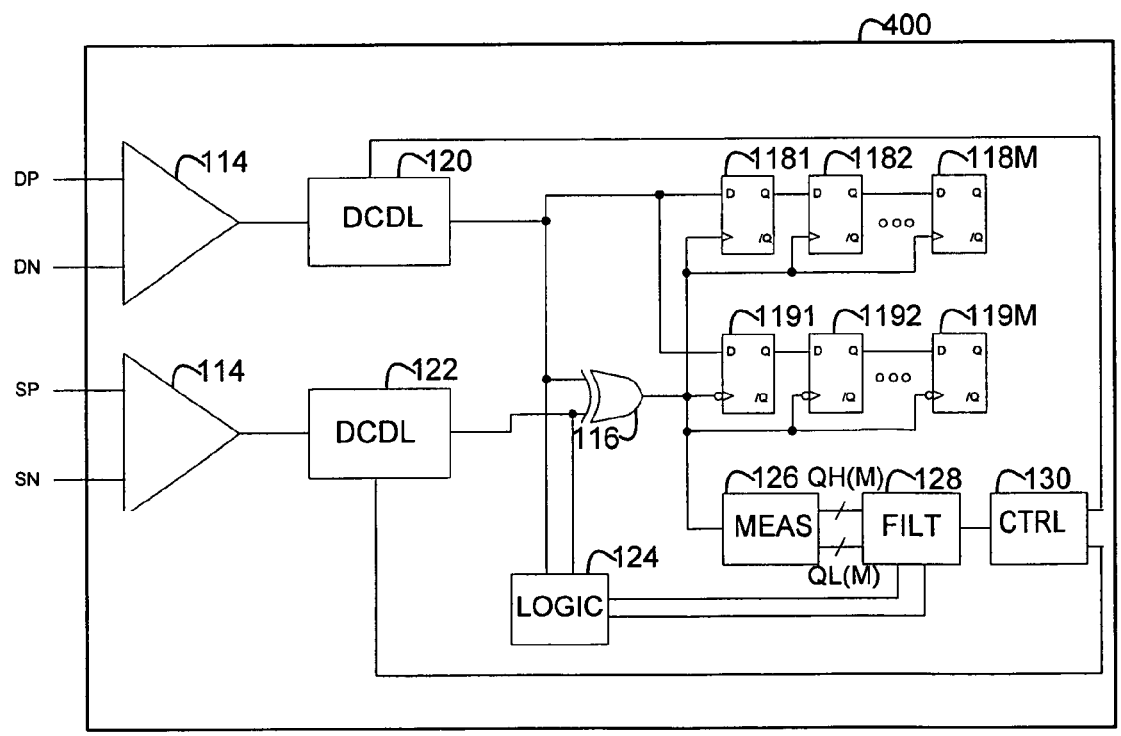
FIG. 4 shows a block diagram of an electronic device and of a CSI-specific receiver according to an embodiment of the invention.

FIG. 4 shows a block diagram of a receiver according to an embodiment of the invention. An embodiment of the invention uses digitally controlled delay elements to compensate for skew effects between data and timing signals. In an embodiment, a new idea of tuning digitally controlled delay elements is proposed. The proposed tuning may be continuous so that the temperature, the time or other skews varying relatively slowly may be calibrated. The receiver may be a part of an electronic device 400 that is used in a digital communications system, for example.

An embodiment of the receiver comprises at least a control unit 130 for controlling the functions of the receiver, a receiving unit for receiving data signals and timing signals, a digitally controlled delay line unit 120, 122 connected to the receiving unit and to the control unit. The control unit 130 is configured to measure several samples of the received data signal and the timing signal. To be exact, the control unit is configured to determine timing relations between the received data signal and the timing signal on the basis of the several measured samples of the received data signal and the timing signal. Next, the control unit is configured to determine average values of the several measured samples of the data signal and the timing signal for defining compensation values, and the digitally controlled delay line unit is configured to adjust the number of unit delay elements for compensating for skew between the data signal and the timing signal on the basis of the defined compensation values.

In FIG. 4, the example of the proposed receiver module structure further comprises comparators 114, digitally controlled delay line units 120, 122, an XOR gate 116, a number of flip-flops in an upper row 1181, 1182, 118M, a number of flip-flops in a lower row 1191, 1192, 119M, a measuring unit 126, a filtering unit 128, a logic unit 124 and a control unit 130 for controlling the functions of the receiver. The number of elements in the receiver may also be different than that described in these examples, and there may also be elements that are not described in these examples included in the receiver.

In an embodiment, the digitally controlled delay line units 120, 122 receive compensation values, such as tuning words, from the control unit 130 in order to compensate for skew between the received data and timing signals. The control unit 130 is control logic that controls the delay line units 120, 122 by providing the compensation values (tuning words) for the delay line units 120, 122. The logic unit 124 may be used for determining valid measurement results, and the filtering unit 128 is for providing average values of several measurements.

The purpose is to calibrate out skew between data and timing signals, and thus it must be carefully decided what events are measured in order to obtain reliable results. In an embodiment, the measuring unit 126 is configured to measure several samples of an XOR (eXclusive OR) function of the received data and timing signals, and the filtering unit 128 is configured to determine an average value of the several measured samples of the XOR function for defining an XOR signal. The control unit 130 may then use the defined XOR signal when defining compensation values for the delay line units 120, 122.

In order for the measurements of the signals to be meaningful, one of the XOR signal edges may be defined by a data signal edge, and another XOR signal edge may be defined by a strobe signal edge, for example. Table 1 shows the different measurement cases possible.

TABLE 1

Measurement cases

| Hold-time measurement | | | Set-up time measurement | | |
|---|---|---|---|---|---|
| STROBE first | DATA next | STATE | DATA first | STROBE next | STATE |
| Up | Up | High | Up | Up | High |
| Up | Down | Low | Up | Down | Low |
| Down | Up | Low | Down | Up | Low |
| Down | Down | High | Down | Down | High |

The logic unit 124 may be used to seek for correct measurement cases and to inform the filtering unit 128 about whether the measurement was for a hold-time or for a setup-time, and whether to measure the high state or the low state. If the strobe signal is delayed in relation to the data signal, a hold-time of the flip-flops 1181-118M, 1191-119M that are used to capture the data may be jeopardized. In such cases the measurement result of the measuring unit 126, whether it is high state or low state, is smaller compared to the setup-time measurement result. If a strobe signal is advanced in relation to the data signal, a setup-time margin may be jeopardized. In such cases the strobe signal should be delayed (or the data signal should be advanced) by adjusting the delay line units 120, 122. If a CSI link is used in the class0-mode, then all measurement data is meaningful and the use of the logic unit 124 is not necessary.

In an embodiment, adjusting the number of unit delay elements for compensating for skew between the data and timing signals is based on measuring that samples of the XOR signal are at a high state or at a low state for a predetermined minimum period of time. The minimum period of time that the XOR signal has to be at the high state or at the low state may be predetermined on the basis of an internal structure of the receiver. The minimum period of time may consist of delay differences between the data and timing signals, and setup-times and hold-times of the flip-flops 1181-118M, 1191-119M.

In an embodiment, in order to avoid incorrect data capture, a pulse shape of the XOR signal is measured, and then the number of unit delay elements for compensating for skew between the data and timing signals is adjusted on the basis of a determined average value of the measured pulse shape of the XOR signal.

Figure 5:
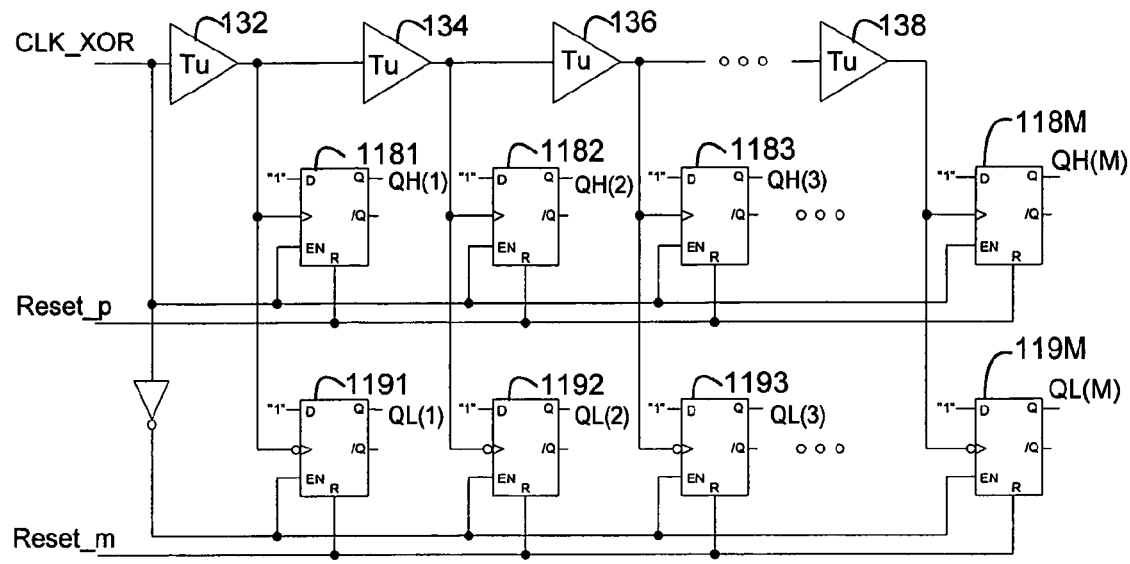
FIG. 5 is a block diagram of an example of measuring a pulse shape digitally in a CSI-specific interface.

Next an example of measuring of the pulse shape of the XOR signal is explained. FIG. 5 is a block diagram of an example of measuring a pulse shape digitally. The diagram in FIG. 5 corresponds to the measuring unit 126 of FIG. 4. A number of unit delays 132, 134, 136, 138 in FIG. 5 have a delay of Tu. The measuring unit 126 further comprises a number of flip-flops 1181, 1182, 1183, 118M, 1191, 1192, 1193, 119M for storing the value of how far a falling edge of the XOR signal propagates during the low state. When the XOR signal CLK_XOR is at the high state the upper row of flip-flops 1181, 1182, 1183, 118M is enabled. If the XOR signal CLK_XOR is at the low state, then the bottom row of flip-flops 1191, 1192, 1193, 119M is enabled instead.

There are effects, such as jitter, that vary the shape of the XOR-signal on a cycle-to-cycle basis. Thus, several samples of the XOR-signal shape are required to filter out these short term effects and to find out the real average value. The filtering unit 128 of FIG. 4 receives outputs QH and QL of the measuring unit 126. The filtering unit 128 may also receive information on whether the measurement was for a hold-time case (CaseHold) or for a setup-time case (CaseSetup) from the logic unit 124. The filtering unit 128 may take several (and possibly an equal amount) of both CaseHold and CaseSetup samples and calculate an average of the values for a programmable number of samples. The filtered value by the filtering unit 128 is an input for the control unit 130. The filtering unit 128 may also be implemented in several other ways.

Figure 6:
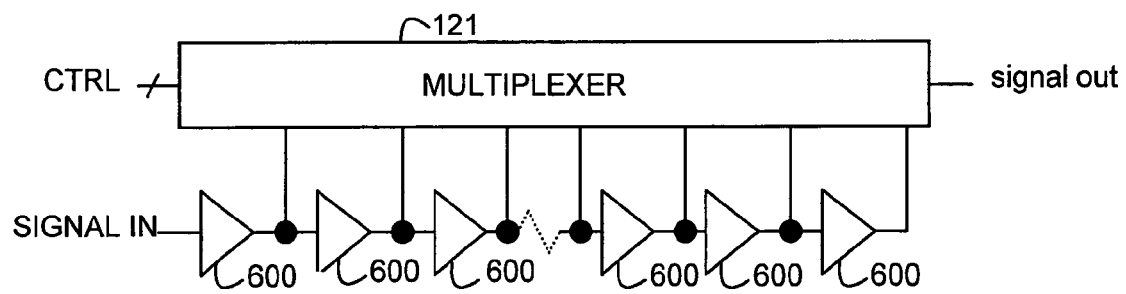
FIG. 6 shows an example of a delay element.

The control unit 130 controls the delay line units 120, 122 by adjusting the number of unit delays in the delay line. The control unit 130 may use different algorithms for adjusting the delays. FIG. 6 shows one example of the digitally controlled delay line element implementation. The digitally controlled delay elements may simply be a row of buffers or inverters, and a multiplexer 121 may be used to select the output and also the delay. The number of the unit delays 600 needed depends on how much skew need to be cancelled. For example, if there are K unit delays of delay $T_u$ in both of the delay lines, then skews from $-KT_{unit}$ to $+KT_{unit}$ can be cancelled.

Next an embodiment of a solution for a DDR (Double Data Rate) clocking mode is described. In the DDR-mode the clock is transmitted at half speed and both edges of the clock are used to latch data at the receiving end.

Figure 7:
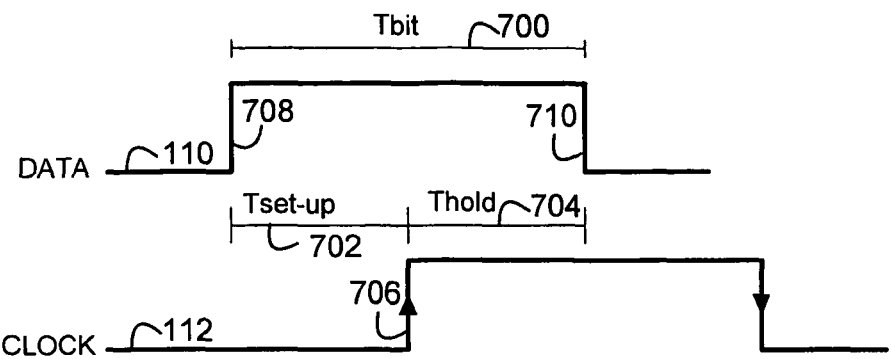
FIG. 7 shows an ideal case of DDR (Double Data Rate) clocking from the receiver point of view.
Figure 8:
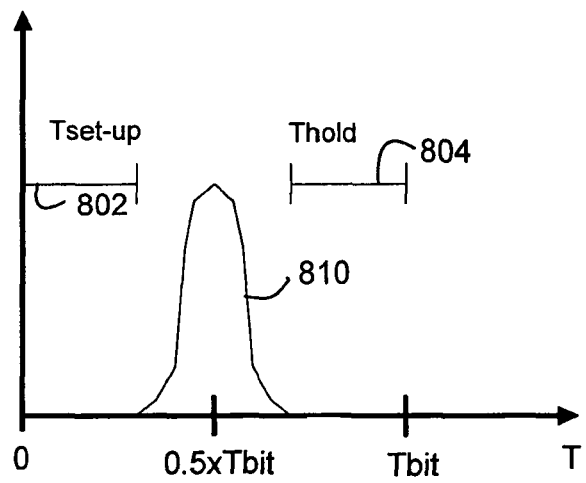
FIG. 8 shows an example of a DDR-clocking histogram with zero skew but non-zero jitter.

FIG. 7 shows an ideal case of DDR clocking from the receiver point of view. The clock signal 112 in FIG. 7 is exactly at the middle point of the valid bit period 700 related to the data signal 110. Thus, there is a maximum margin for jitter to vary clock signal edges. A setup-time margin 702 and a hold-time margin 704 are equal. The same situation can also be described with a histogram having a clock jitter added. FIG. 8 shows an example of a DDR-clocking histogram 810 in an ideal case. The setup and hold-time margins 802, 804 have decreased slightly due to the jitter effect. However, they are equal in time. The setup-time margin 802 can be measured from the moment in time at which the data signal changes (708 in FIG. 7) to the moment in time at which the next clock signal edge appears (706 in FIG. 7). The hold-time margin 804 can be measured from the clock edge (706 in FIG. 7) to the moment in time at which the data signal changes (710 in FIG. 7).

Figure 9:
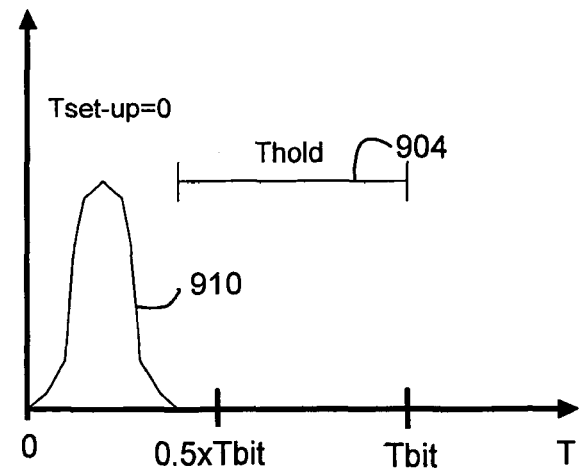
FIG. 9 shows another example of a DDR-clocking histogram in a zero setup-time margin case.

Next a situation where a data signal is delayed from the ideal locations in relation to the clock signal is described. The same situation also arises when the clock signal is advanced in relation to the data signal. In such situations it is possible that the setup-time margin goes zero or almost zero. FIG. 9 shows an example of a DDR-clocking histogram 910 in a zero setup margin case. 904 is a hold-time margin in FIG. 9. In practise, however, positive margins greater than zero are desirable.

Figure 10:
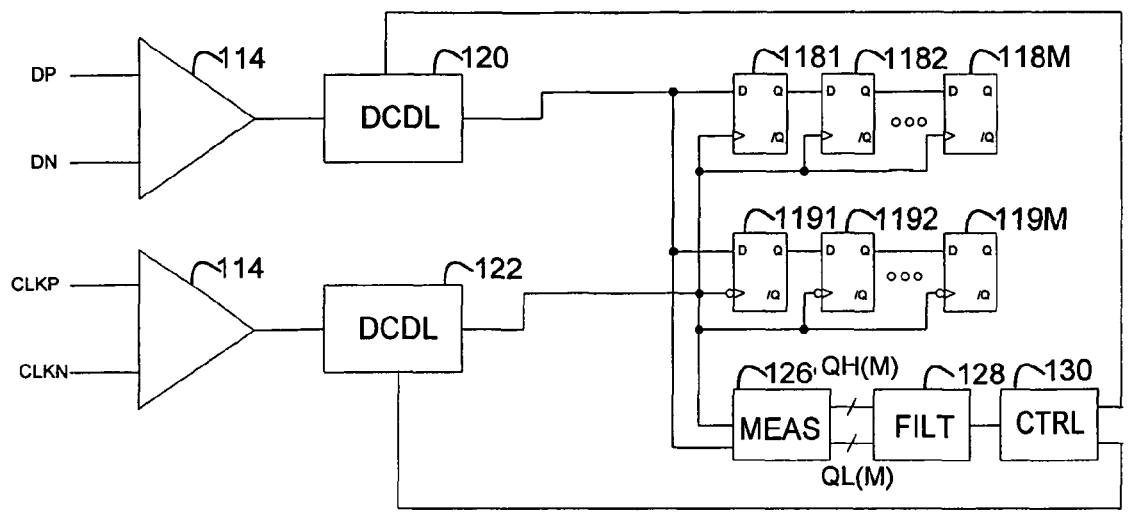
FIG. 10 shows a simplified schematic of a communications system with compensation logic.

FIG. 10 shows a simplified schematic of a communications system with compensation logic. The receiver module structure of FIG. 10 comprises comparators 114, digitally controlled delay line units 120, 122, a number of flip-flops in an upper row 1181, 1182, 118M, a number of flip-flops in a lower row 1191, 1192, 119M, a measuring unit 126, a filtering unit 128 and a control unit 130 for controlling the functions of the receiver. The histogram 910 of FIG. 9 can be adjusted so that the setup-time margin becomes greater than zero by delaying the clock signal or advancing the data signal. This can be done by tuning the delay lines in the receiver of FIG. 10.

Figure 11:
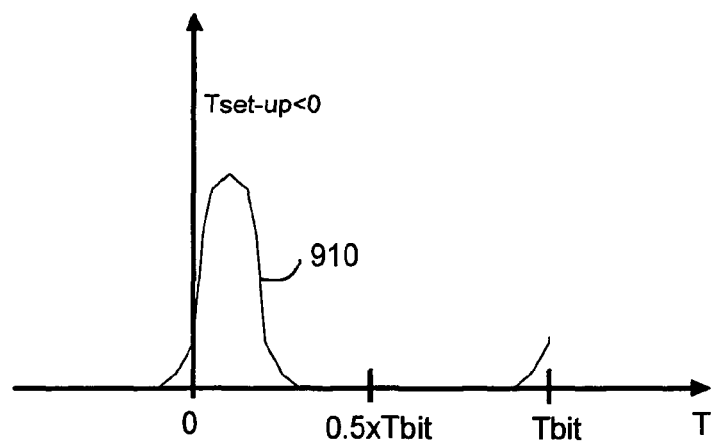
FIG. 11 shows an example of a DDR-clocking timing histogram.

In order for calibration or compensation algorithms to work, they need to be able to cope with a start-up situation where the setup-time margin (or hold-time margin) is negative. FIG. 11 shows an example of a DDR-clocking histogram 910 in a negative setup-time margin case. Due to jitter, some of the setup-time margin cases are negative, that is, wrong data is latched occasionally. However, the setup-time measurement circuit is not aware of the situation because of aliasing. The measuring unit 126 actually sees only the positive side of the time axis T of FIG. 11. Thus, measuring average values is not enough to recover from this situation. In an embodiment, a histogram shape is measured to overcome the situation of the negative setup-time margin.

Figure 12:
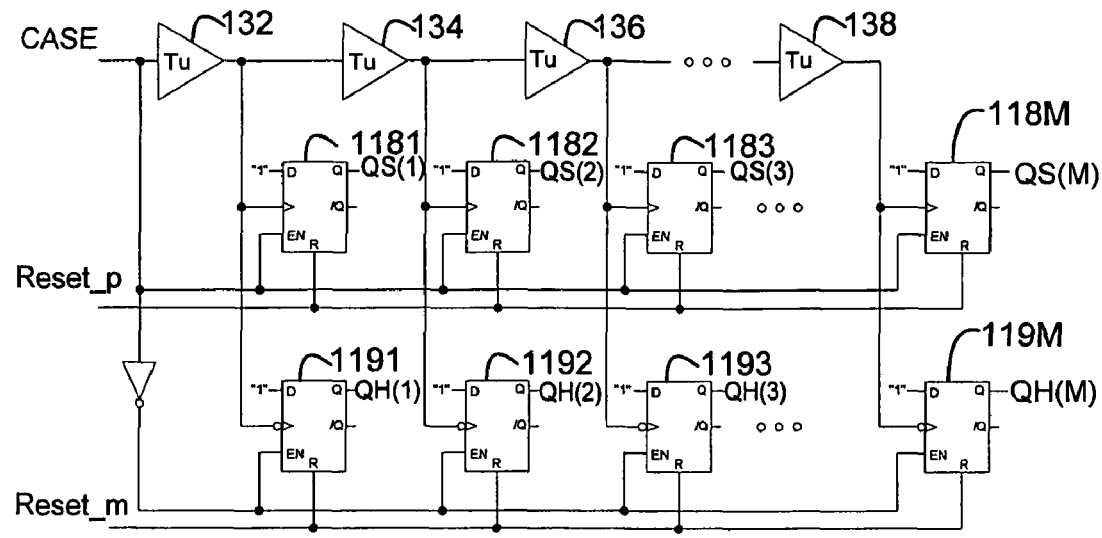
FIG. 12 is a block diagram of a setup-time and hold-time margin measurement circuitry.

In an embodiment, setup-time margins and hold-time margins are first measured over several bit periods. The measurement can be done by using a circuitry of FIG. 12, for example. FIG. 12 is a block diagram of a setup-time and a hold-time margin measurement circuitry. The circuitry corresponds to the measuring unit 126 of FIG. 10, for example. A number of unit delays 132, 134, 136, 138 each have a delay of Tu. The measuring unit 126 further comprises a number of flip-flops 1181, 1182, 1183, 118M, 1191, 1192, 1193, 119M for storing the measurement values. Now the outputs are a setup-time margin QS and a hold-time margin QH. The length of the delay line does not need to be as long as a bit period. Only a relatively short delay line is required (a small number of Ms) to get a reliable margin for the actual implementation. The measuring unit 126 further comprises some logic elements to deduce which of the two possible measurement cases is valid (not-shown in FIG. 12).

Figure 13:
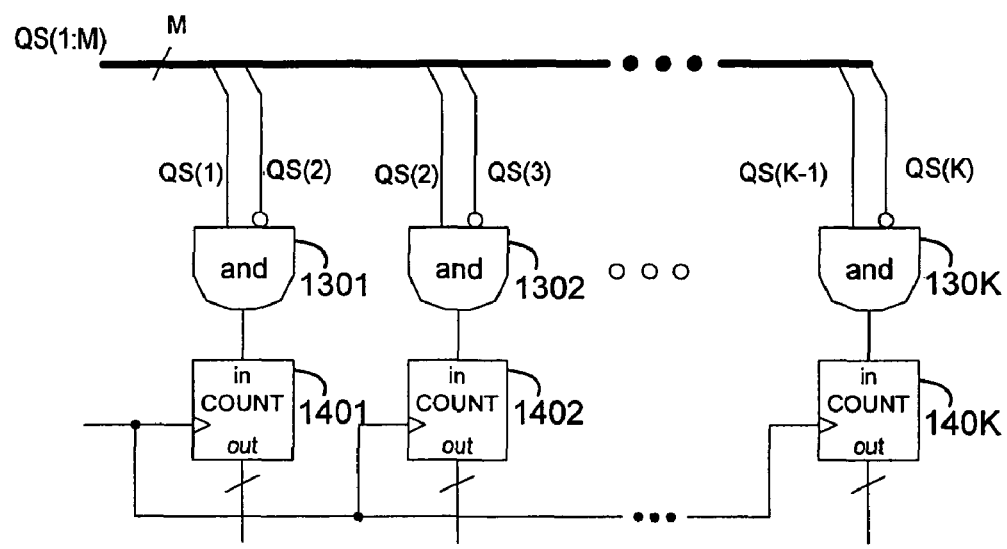
FIG. 13 shows an example of a histogram measurement circuitry.

In an embodiment, both the setup-time margin and the hold-time margin histograms are measured. FIG. 13 shows an example of a histogram measurement circuitry that may be used for measuring histogram shapes. The circuitry of FIG. 13 can be a part of the filtering unit 128 of the receiver described in FIG. 10, for example. The circuitry of FIG. 13 comprises AND gates 1301, 1302, 130K and counters 1402, 1402, 140K. In an embodiment, two of the circuits in FIG. 13 are needed; one for the setup-time margin and one for the hold-time margin. The histogram shapes can be measured over several bit periods for getting a reliable jitter distribution. From the shapes of the histograms it is possible to deduce which way the delay elements should be adjusted.

In the DDR clocking mode, skew compensation capability equal to a bit period is enough for recovering from any skew if the clock signal is continuous. The reason for this is that it does not matter which clock signal edge is used for data latching.

Figure 14:
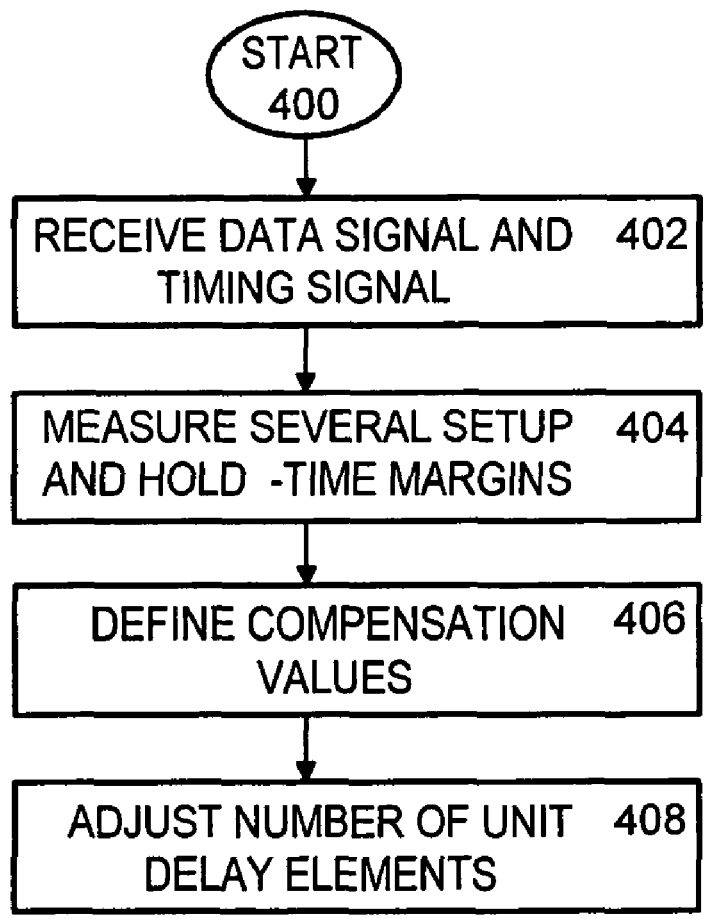
FIG. 14 shows an example of a method of digital compensation for skew in a fast digital bus.

Finally FIG. 14 shows an example of a method of digital compensation for skew in a fast digital bus. The method starts in 400. In 402, a data signal and a timing signal are received by a receiver. In 404, several setup-time and hold-time margins of the received data signal and the timing signal are measured. The object is to determine timing relations between the received data signal and the timing signal. In 406, average values of the several measured samples of the data signal and the timing signal are determined for defining compensation values. In 408, the number of unit delay elements for compensating for skew between the data signal and the timing signal is adjusted on the basis of the defined compensation values.

Embodiments for a fully digital implementation for skew compensation in a digital bus have been described above. A camera interface was used as one example along with the example of DDR clocking. In the DDR-clocking scheme more emphasis was put on how to recover from a negative margin initial condition. However, same considerations can also be applied to the camera interface with some adjustments.

When skew compensation has recovered from a negative initial condition, it keeps tracking the skews in real time and thus reacting for possible skew changes due to the temperature or other slowly varying effects. The described embodiments can be used for existing digital busses to increase data throughput, for example.

In an aspect, the invention provides a computer program product encoding a computer program of instructions for executing a computer process of compensating for skew in a digital communication system using a data signal and a timing signal for communicating data. An embodiment of the computer process is shown and described in conjunction with FIG. 14. The computer program may be executed in a digital signal processor of a receiver.

Even though the invention is described above with reference to an example according to the accompanying drawings, it is clear that the invention is not restricted thereto but it can be modified in several ways within the scope of the appended claims.

The invention claimed is:

1. A method comprising:
   receiving a data signal and a timing signal by a receiver;
   measuring a pulse shape of an eXclusive OR (XOR) signal on the basis of several measured samples of an XOR function of the received data signal and the timing signal;
   determining, based on average values of the measured pulse shape of the XOR signal, whether the XOR signal is at a high state or at a low state for a predetermined minimum period of time, wherein the minimum period of time is based on delay differences between the data and timing signals, and further based on at least one of setup-times and hold-times of the receiver; and
   adjusting a number of unit delay elements for compensating for skew between the data signal and the timing signal on the basis of whether the XOR signal is at the high state or the low state for the predetermined minimum period of time.

2. The method of claim 1, the method further comprising adjusting the number of unit delay elements on the basis of whether high state or low state measurements of the XOR signal are used, and on whether the measurement is for a hold-time case or for a setup-time case.

3. The method of claim 1, wherein measuring the pulse shape of the XOR signal comprises defining a first edge of a pulse of the XOR signal on the basis of the data signal and defining a second edge of the pulse of the XOR signal on the basis of the timing signal.

4. The method of claim 1, wherein the compensation values are defined by measuring setup-time margins and hold-time margins of the data and the timing signals, and by determining a setup-time margin histogram and a hold-time margin histogram on the basis of the measured setup-time and hold-time margins; and adjusting the number of unit delay elements for compensating for skew between the data and timing signals is based on the shapes of the determined setup-time margin and hold-time margin histograms.

5. The method of claim 1, wherein the timing signal comprises at least one of a clock signal and a strobe signal.

6. The method of claim 1, wherein measuring the pulse shape of the XOR signal comprises measuring the several samples of the XOR function via a series of flip-flops.

7. A receiver, comprising:
a control unit configured to control the functions of the receiver;
a receiving unit configured to receive data signals and timing signals;
a digitally controlled delay line unit connected to the receiving unit and to the control unit, the control unit being configured to measure a pulse shape of an eXclusive OR (XOR) signal on the basis of several measured samples of an XOR function of the received data signal and the timing signal, and to determine, based on average values of the measured pulse shape of the XOR signal, whether the XOR signal is at a high state or at a low state for a predetermined minimum period of time, wherein the minimum period of time is based on delay differences between the data and timing signals, and further based on at least one of setup-times and hold-times of the receiver, and the digitally controlled delay line unit being configured to adjust a number of unit delay elements for compensating for skew between the data signal and the timing signal on the basis of whether the XOR signal is at the high state or the low state for the predetermined minimum period of time.

8. The receiver of claim 7, wherein the control unit comprises a measuring unit configured to measure several samples of the XOR function, and a filtering unit configured to determine average values of the measured pulse shape of the XOR signal for defining the compensation values.

9. The receiver of claim 7, wherein the control unit further comprises a logic unit configured to determine which measurements of the samples of the XOR function are valid.

10. The receiver of claim 9, wherein the logic unit is further configured to indicate whether the measurement is for a hold-time case or for a setup-time case.

11. The receiver of claim 7, wherein the control unit is further configured to define the compensation values by measuring setup-time margins and hold-time margins of the data and the timing signals, and by determining a setup-time margin histogram and a hold-time margin histogram on the basis of the measured setup-time and hold-time margins; and to adjust the number of unit delay elements for compensating for skew between the data and timing signals on the basis of the shapes of the determined setup-time margin and hold-time margin histograms.

12. The receiver of claim 7, wherein the control unit comprises a series of flip-flops configured to measure the pulse shape of the XOR signal.

13. An apparatus, comprising:
a receiver including:
a receiving unit configured to receive data signals and timing signals;
a control unit configured to measure a pulse shape of an XOR signal on the basis of several measured samples of an eXclusive OR (XOR) function of the received data and timing signals, and determine average values of the measured pulse shape of the XOR signal for defining compensation values;
a digitally controlled delay line unit connected to the receiving unit and to the control unit and configured to adjust a number of unit delay elements for compensating for skew between the data signal and the timing signal on the basis of the defined compensation values; and
a filter unit configured to define the compensation values by measuring setup-time margins and hold-time margins of the data and the timing signals, and by determining a setup-time margin histogram and a hold-time margin histogram on the basis of the measured setup-time and hold-time margins; and wherein the digitally controlled delay line unit is configured to adjust the number of unit delay elements for compensating for skew between the data and timing signals on the basis of the shapes of the determined setup-time margin and hold-time margin histograms.

14. The apparatus of claim 13, wherein the control unit comprises a series of flip-flops configured to measure the pulse shape of the XOR signal.

15. A circuit for use in a receiver, comprising:
a control block configured to control the functions of the circuit;
a digitally controlled delay line block connected to the control block;
a measuring block configured to measure a pulse shape of an eXclusive OR (XOR) signal on the basis of several measured samples of an XOR function of received data and timing signals;
a filtering block connected to the measuring block and to the control block, and configured to determine, based on average values of the measured pulse shape of the XOR signal, whether the XOR signal is at a high state or at a low state for a predetermined minimum period of time, wherein the minimum period of time is based on delay differences between the data and timing signals, and further based on at least one of setup-times and hold-times of the receiver, and
the digitally controlled delay line block being configured to adjust a number of unit delay elements for compensating for skew between the data signal and the timing signal on the basis of whether the XOR signal is at the high state or the low state for the predetermined minimum period of time.

16. The circuit of claim 15, further comprising a logic block connected to the delay line block and to the filtering block configured to determine which measurements of the samples of the received data signal and timing signal are valid.

17. The circuit of claim 16, wherein the logic block is further configured to indicate to the filtering block whether the measurement is for a hold-time case or for a setup-time case.

18. The circuit of claim 15, wherein the filtering block is further configured to define the compensation values by measuring setup-time margins and hold-time margins of the data and the timing signals, and by determining a setup-time margin histogram and a hold-time margin histogram on the basis of the measured setup-time and hold-time margins, and the delay line block is configured to adjust the number of unit delay elements for compensating for skew between the data and timing signals on the basis of the shapes of the determined setup-time margin and hold-time margin histograms.

19. The circuit of claim 15, wherein the measuring block comprises a series of flip-flops configured to measure the pulse shape of the XOR signal.

20. An apparatus comprising:
a digital signal processor; and
a computer program product encoding a computer program of instructions for executing a computer process via the apparatus, the process comprising:
receiving a data signal and a timing signal by a receiver;
measuring a pulse shape of an eXclusive OR (XOR) signal on the basis of several measured samples of an XOR function of the received data signal and the timing signal;

determining, based on average values of the measured pulse shape of the XOR signal, whether the XOR signal is at a high state or at a low state for a predetermined minimum period of time, wherein the minimum period of time is based on delay differences between the data and timing signals, and further based on at least one of setup-times and hold-times of the receiver; and adjusting a number of unit delay elements for compensating for skew between the data signal and the timing signal on the basis of whether the XOR signal is at the high state or the low state for the predetermined minimum period of time.

21. The apparatus of claim 20, the process further comprising: defining the compensation values by measuring setup-time margins and hold-time margins of the data and the timing signals, and by determining a setup-time margin histogram and a hold-time margin histogram on the basis of the measured setup-time and hold-time margins; and adjusting the number of unit delay elements for compensating for skew between the data and timing signals on the basis of the shapes of the determined setup-time margin and hold-time margin histograms.

* * * * *